United States Patent [19]

Berke

[11] E Patent Number: Re. 33,556

[45] Reissued Date of Patent: Mar. 19, 1991

[54] COMPUTER TERMINAL SUPPORT AND HAND REST

[76] Inventor: Joseph J. Berke, 2063 Long Lake Shore, West Bloomfield, Mich. 48033

[21] Appl. No.: 416,605

[22] Filed: Oct. 2, 1989

Related U.S. Patent Documents

Reissue of:

[64] Patent No.: 4,482,063
Issued: Nov. 13, 1984
Appl. No.: 331,954
Filed: Dec. 18, 1981

U.S. Applications:

[62] Division of Ser. No. 137,808, Apr. 4, 1980, Pat. No. 4,481,556.

[51] Int. Cl.[5] ..... A47F 7/00

[52] U.S. Cl. ..... 211/69.1; 248/118; 361/222

[58] Field of Search ..... 248/118, 118.1, 118.3, 248/205 R, 300, 441 B, 442.2, 673, 678; 108/28, 29, 59; 5/503; 297/188; 24/69.1

[56] References Cited

U.S. PATENT DOCUMENTS

| | | |
|---|---|---|
| 160,224 | 10/1949 | Smyth . |
| 393,496 | 11/1888 | Ashby . |
| 1,277,169 | 8/1918 | Anderson . |
| 1,289,861 | 12/1918 | Mills . |
| 1,632,537 | 5/1926 | Brigel . |
| 1,801,669 | 4/1929 | Hintz et al. . |
| 1,920,889 | 7/1929 | Pullen . |
| 1,979,773 | 5/1934 | Ritch . |
| 2,193,414 | 6/1938 | Berkman . |
| 2,325,414 | 5/1941 | McChesney et al. . |
| 2,614,155 | 4/1950 | Lippy . |
| 2,950,890 | 1/1958 | Hough, Jr. . |
| 3,099,774 | 1/1960 | Crane . |
| 3,268,766 | 2/1964 | Amos . |
| 3,300,173 | 5/1965 | Kennedy, Jr. . |
| 3,300,250 | 10/1965 | Dollgener et al. . |
| 3,711,742 | 1/1973 | Pinkham, Jr. . |
| 4,066,171 | 1/1978 | Fowlie . |
| 4,303,960 | 12/1981 | Sherwood et al. . |
| 4,313,112 | 1/1982 | Foster . |

FOREIGN PATENT DOCUMENTS

| | | |
|---|---|---|
| 310997 | 5/1931 | Canada . |
| 751828 | 1/1967 | Canada . |
| 1010487 | 5/1977 | Canada . |
| 1913287 | 9/1970 | Fed. Rep. of Germany . |
| 2203265 | 8/1973 | Fed. Rep. of Germany . |
| 2836655 | 10/1979 | Fed. Rep. of Germany . |
| 2910855 | 10/1980 | Fed. Rep. of Germany . |

OTHER PUBLICATIONS

L. A. Breton and R. F. Kantner, Protection Against Electrostatic Noises, Dec. 1972, IBM Technical Disclosure Bulletin, vol. 15, No. 7, 2 pages.

Static Electricity Discharged from Quick-Access Panels, Packaging & Materials, Circle No. 301, 1 page.

*Primary Examiner*—Robert W. Gibson, Jr.
*Attorney, Agent, or Firm*—Dykema Gossett

[57] ABSTRACT

A computer terminal support and hand rest to be placed on a desk top and interposed between the computer terminal and a computer operator as well as being interposed between the computer terminal and the desk top. The computer terminal support provides a hand rest for supporting the hands of the computer operator both during use of the computer terminal and during rest intervals. In a preferred embodiment, the support also includes a conductive portion for draining static charges from the computer terminal operator to prevent circuit damage and erroneous command signals to the computer and to prevent electrical shock to the operator.

Several embodiments of the support are disclosed including alternate structures for providing a static discharge path, alternate structures for supporting the hands and alternate structures for supporting the computer terminal. In addition, some embodiments include a trough into which the fingers of the computer operator may be placed during rest intervals and the trough also functions as a receptacle for pens, pencils and the like.

14 Claims, 3 Drawing Sheets

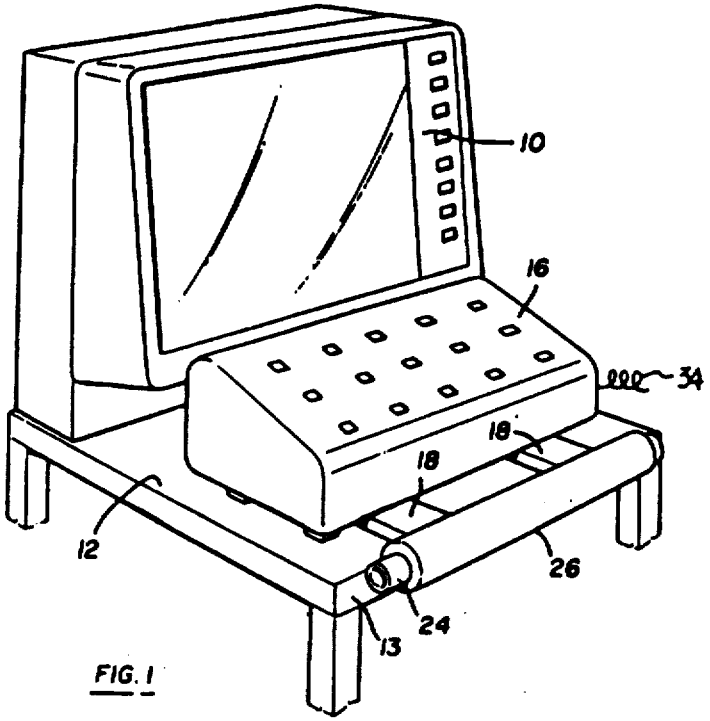
FIG. 1
FIG. 3
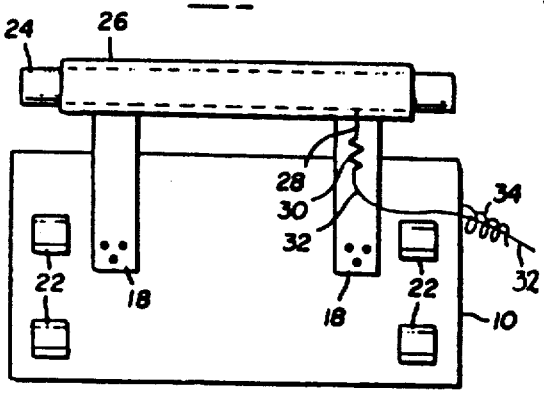
FIG. 2
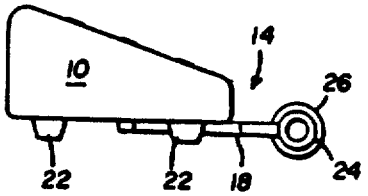
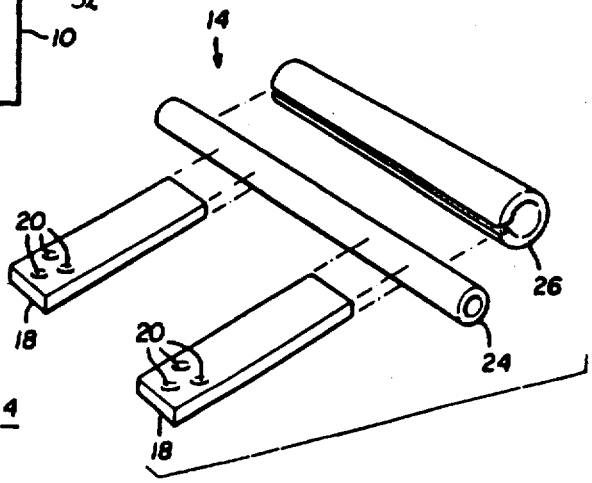
FIG. 4

FIG. 5
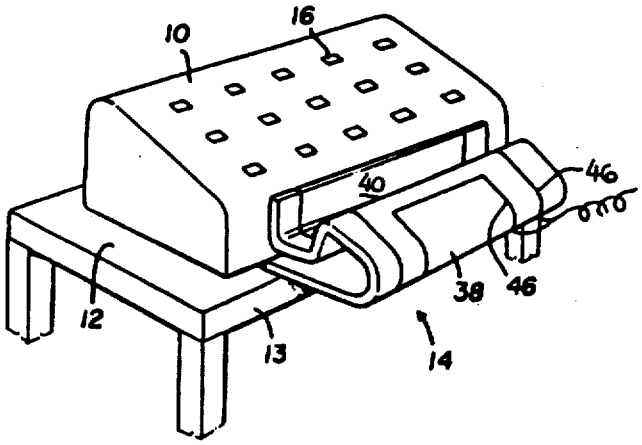
FIG. 7
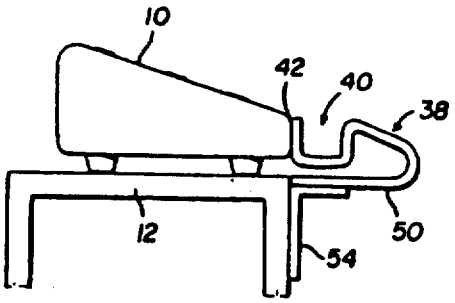
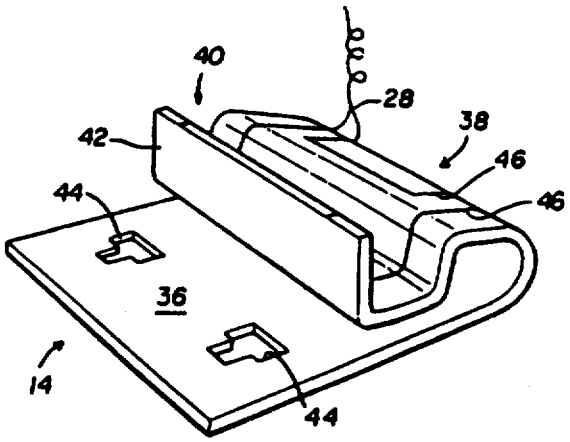
FIG. 6
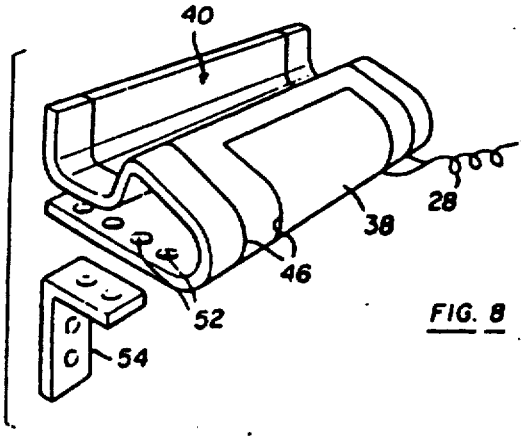
FIG. 8

COMPUTER TERMINAL SUPPORT AND HAND REST

Matter enclosed in heavy brackets [ ] appears in the original patent but forms no part of this reissue specification; matter printed in italics indicates the additions made by reissue.

CROSS REFERENCE TO RELATED APPLICATIONS

This is a division of application Ser. No. 137,808, filed Apr. 4, 1980, *now U.S. Pat. No. 4,481,556.*

BACKGROUND OF THE INVENTION

This invention relates generally to a support member to be interposed between a computer terminal, electric typewriter or other piece of office equipment and the equipment operator, and which is also interposed between a table top, desk top or the like and and the equipment.

In the use of computer terminals and other electric office equipment, there are usually time intervals when the hands of the operator are not on the keyboard such as when the operator is waiting for a command or instruction from the computer. Because the keyboards of computers are extremely sensitive to touch, it is imperative that the operator's hands be completely removed from the keyboard during these intervals.

Heretofore, it has been the practice for the computer operator's hands to be moved sufficiently far from the keyboard, such as being placed on the lap of the computer operator, as to create a substantial loss of efficiency when the computer operator's hands are then placed back on the keyboard. Prior to the present invention, there has been no suitable hand rest provided for computer terminals or other types of office equipment.

In addition, it is well known that a computer operator may develop a static charge which can cause a substantial shock when the operator touches the computer equipment. There are also instances where the draining of the static charge from the computer operator to the computer result in an erroneous response from the computer and/or damage to the computer circuitry.

Various techniques have been developed for draining the static charge from the computer operator such as a suitably grounded conductive pad on the desk top or a suitably grounded conductive pad on the floor underneath the feet of the computer operator. Most of these mechanisms are unacceptable because of their appearance and difficulty of use. The difficulty of use is that a deliberate effort must be made to touch the conductive pad prior to touching the equipment to obtain the benefit of a static discharge.

SUMMARY OF THE INVENTION

The present invention overcomes the aforementioned problems by providing an improved computer terminal support. The present invention, in certain embodiments, provide a hand rest, terminal support and electrical grounding apparatus which is complimentary to and cooperative with the keyboards and keyboard-equipped operator terminals of various types.

In addition, a preferred form of the electrical grounding apparatus is formed and positioned so that it is routinely touched or grasped by the computer operator, allowing for easy removal of any capacitively created voltages from the operator when they are generated, while also providing for restful breaks in hand movement of the operator with minimum loss of efficiency. In addition, the computer terminal support of the present invention is adapted to be interposed between the computer terminal and the desk top to support and distribute the weight of the computer terminal and to prevent the computer terminal from skidding or moving relative to the table top.

The present invention provides a new and improved support member and, more particularly, an improved support member for a computer terminal or the like which provides a convenient resting or grasping place for the hands of the computer operator both during use of the computer and during periods of non-use thus increasing operator efficiency and decreasing operator fatigue.

Furthermore, a preferred embodiment of the present invention provides a combined hand rest and carrying handle. The handle provides added convenience where a computer terminal keyboard is a separate unit since the handle permits easy lifting, positioning and carrying of the keyboard unit.

The present invention further provides an improved computer terminal support including means to position the computer terminal relative to the desk top and to restrict movement of the computer terminal relative to the desk top.

Furthermore, the present invention provides for convenient and safe draining of static charge from the computer operator for the protection of circuits and instructions within the computer.

Finally, several embodiments of the present invention also include a trough or receptacle for the storage of pens, pencils and the like.

BRIEF DESCRIPTION OF THE DRAWINGS

The foregoing objects and advantages of the present invention, together with other advantages which may be attained by its use, will become more apparent upon reading the following detailed description of the invention taken in conjunction with the drawings.

In the drawings, where like reference numerals identify corresponding components:

FIG. 1 is a perspective illustration of a computer terminal positioned on a desk top and including the preferred embodiment of the computer terminal support of the present invention;

FIG. 2 is a side elevation view of the computer terminal and computer terminal support of FIG. 1;

FIG. 3 is a bottom view of the computer terminal and the computer terminal support of FIGS. 1 and 2;

FIG. 4 is an exploded illustration of the preferred form of computer terminal support of the present invention;

FIG. 5 is a perspective illustration of an alternate embodiment of the computer terminal support of the present invention interposed between a computer terminal and a desk top;

FIG. 6 is a perspective illustration of the computer terminal support of FIG. 5;

FIG. 7 is a side elevation view of a computer terminal and a desk top including another embodiment of the computer terminal support of the present invention;

FIG. 8 is an exploded perspective illustration of the computer terminal support means of FIG. 7;

DETAILED DESCRIPTION OF THE PREFERRED EMBODIMENT

Figure 9:
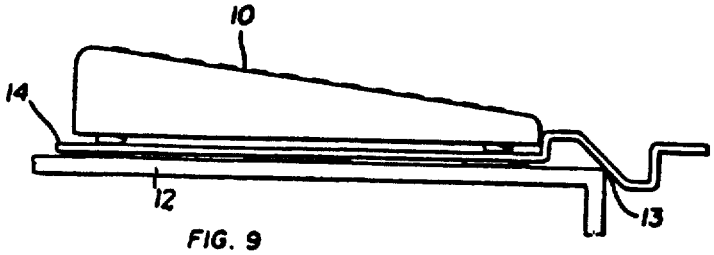
FIG. 9 is a side elevation view of a computer terminal and a desk top illustrating yet another embodiment of the computer terminal support of the present invention interposed between the computer terminal and the desk top.

With reference to FIGS. 1, 2, 3 and 4 there is illustrated a computer terminal keyboard or other type of electric office equipment 10 positioned on the top of a desk or table 12, having a front or forward edge 13. Interposed between the computer terminal and the desk 12 is the preferred embodiment of the computer terminal support 14 of the present invention. The computer terminal 10 may include a keyboard 16 and thus the present invention may be utilized with all types of office equipment including keyboards such as computer terminals, adding machines, typewriters and other types of word processing equipment.

With further reference to the drawings, the computer terminal support 14 of FIGS. 1–4 includes a first section which is to be interposed between the computer terminal and the desk top. This first section comprises two thin, flat elongated members 18 which may be made of a plastic material. Each of these flat members 18 includes, at a first end, a plurality of apertures 20 to receive screws therethrough so that the flat members 18 may be fastened to the underside of the computer terminal keyboard 16. FIG. 3 illustrates these flat members 18 attached to the underside of the computer terminal keyboard 16. The computer terminal keyboard 16 usually includes a plurality of downwardly depending feet 22 and the flat members 18 which comprise the first section of the computer terminal support are illustrated as being positioned inwardly of these feet 22. The flat members 18 may be joined under the keyboard and may include a non-slip surface material.

The preferred embodiment of the computer terminal support also includes a second section attached to the first section 18 of the support. In the preferred embodiment this second section includes an elongated tubular member 24, also preferably formed of plastic, around which is secured a conductive means 26. In the preferred embodiment, the conductive means does not extend the full length of the tube 24. Preferably the conductive means may be a conductive material such a Velcro-type loop fastening material sold under the trademark HI-MEG. HI-MEG VELCRO refers to a hook and loop type fastening medium which is electrically conductive.

As illustrated in FIG. 3, the conductive means 26 is connected by a short length of wire 28 to a current limiting resistor 30. The other side of the resistor 30 is connected by a wire 32 to a suitable ground to provide for static charge drain for the operator. The grounding wire 32 is shown as being separate and distinct from the computer power line 34 to indicate that the conductive means is not grounded to the keyboard circuit ground but to a primary power ground such as that found at a wall outlet. This avoids the creation of a ground loop. In a preferred embodiment the short length of wire 28 is a stranded copper wire with the strands fanned out and secured to the conductive means 26. The conductive means 26 is adhesively secured around the tube 24.

In use, the support 14 of the present invention is shown as being interposed between the computer terminal keyboard and the top of a desk 12. When an operator is sitting at the desk 12 to utilize the computer terminal keyboard, the support of the present invention is also interpese between the computer terminal operator and the computer terminal and the second section or tube 24 of the support thus provides for drain of any static charge on the computer terminal operator. In addition, the conductive means and tube provide a convenient resting place for the hands of the computer operator during periods of non-use of the computer terminal and furthermore, the wrists of the computer terminal operator may rest on the support while the operator is actually using the computer terminal keyboard. Finally, it may be appreciated that since the computer terminal support 14 is secured to the computer terminal keyboard unit, the support also functions as a handle so that the keyboard unit may be carried to other locations.

Having thus described the preferred embodiment of the present invention, reference should now had to FIGS. 5 and 6 of the drawings for an explanation of an alternate embodiment of the present invention. In FIGS. 5 and 6 the computer terminal support is illustrated as having a generally flat first section 36 which is interposed between the computer terminal 10 and the top of the desk 12. As is the case in the embodiment of FIGS. 1–4, the flat section of the computer terminal support of FIGS. 5 and 6 extends generally parallel to the top of the desk and inwardly of the forward edge 13 of the desk. The first or flat section also extends outwardly of the forward edge of the desk toward the computer operator.

The flat section 36 is curved back upon itself toward the computer terminal and at a slight upward incline to define a second section 38. This second section 38 provides a rest for the hands of the computer operator during periods of non-use of the computer terminal and also a resting place for the computer terminal operator's wrists when the hands or fingers of the computer operator are on the keyboard.

The second section 38 of the computer terminal support terminates in an upwardly opening U-shaped trough 40 which provides a convenient resting place for the fingers of the computer operator during periods of non-use of the computer terminal and also provides a receptacle for pens, pencils, erasers and the like. That portion of the U-shaped trough 40 which is closest to the computer terminal is a generally vertical wall 42 against which the leading edge of the computer terminal may be aligned. In the embodiment of FIGS. 5 and 6 the flat first section 36 of the support includes a plurality of apertures 44 through which the feet 22 of the computer terminal may extend and thus be in contact with the table top. By the provision of these apertures 44, the computer terminal is retained in a level position on the table top rather than having the front portion of the computer terminal elevated slightly because of the thickness of the flat section of the computer terminal support.

In the embodiment of FIGS. 5 and 6 conductive means 46 are provided to allow for the drain of the static charge from the computer operator. Specifically, gold plated grounding wires are embedded in the surface of the second section 38 of the computer terminal support. These gold plated grounding wires are connected by a wire 28 to a resistor (not shown in FIGS. 5 and 6) and then to a power ground as described with respect to the prior embodiment. The conductive material 26 of FIGS. 1–4 may be used in the embodiment of FIGS. 5 and 6 in place of the grounding wires 46.

Referring next to FIGS. 7 and 8 yet another embodiment of the present invention is illustrated. The embodiment of FIGS. 7 and 8 provides for a relatively permanent attachment of the support 14 to the desk 12. To accomplish this objective, the computer terminal support 14 of FIGS. 7 and 8 includes a flat first section 50 which is shorter than the corresponding flat section 36 of the embodiment of FIG. 6. The flat first section of the computer support 14 of FIGS. 7 and 8 is also curved back upon itself on a slight upward incline to define a second section which also includes a U-shaped trough corresponding to the embodiments of FIGS. 5 and 6. Conductive means such as the grounding wire or conductive mat may also be provided.

With respect to the embodiment of FIGS. 7 and 8, instead of apertures for the feet of the computer terminal, the edges of the flat first section 50 are provided with a series of apertures 52 through which suitable screws may extend. Angle brackets 54 are provided and the angle brackets, which include apertures for fasteners, are secured both to the flat section 50 of the support and the front of the desk 12.

Thus according to the embodiment of FIGS. 7 and 8, the computer terminal support may be permanently secured to angle brackets which angle brackets in turn are permanently secured to the front of the desk 12. In this embodiment, the front vertical wall 42 of the U-shaped trough provides a surface against which the front of the computer terminal may be aligned. That is, the computer terminal may be moved so that the front edge of the computer terminal is in abutting contact with the vertical wall 42 of the support member.

Since the terminal support may be formed by extrusion, the side-to-side width may be increased to permit a plurality of terminals to be aligned along the forward edge of a counter-type work surface.

Figure 10:
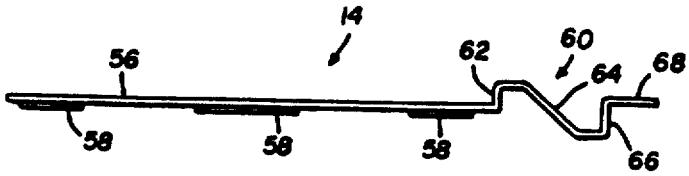
FIG. 10 is a side elevation view of the computer terminal support of FIG. 9.
Figure 11:
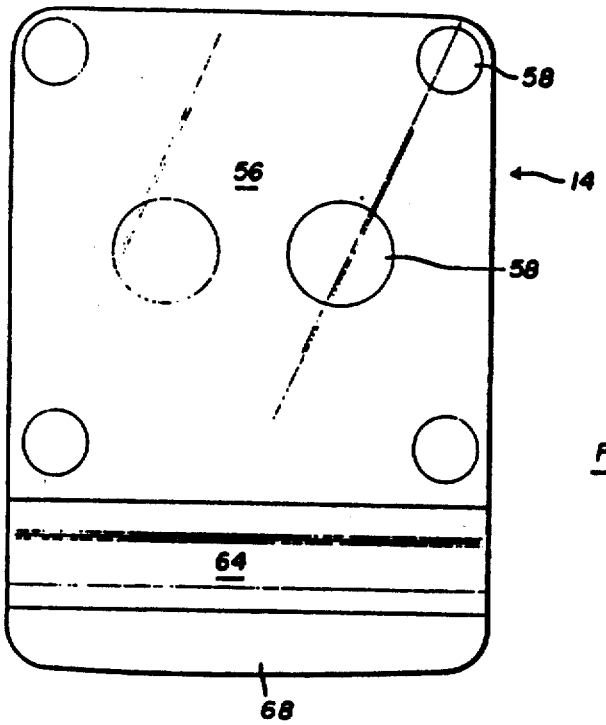
FIG. 11 is a top plan view of the computer terminal support of FIGS. 9 and 10.
Figure 12:
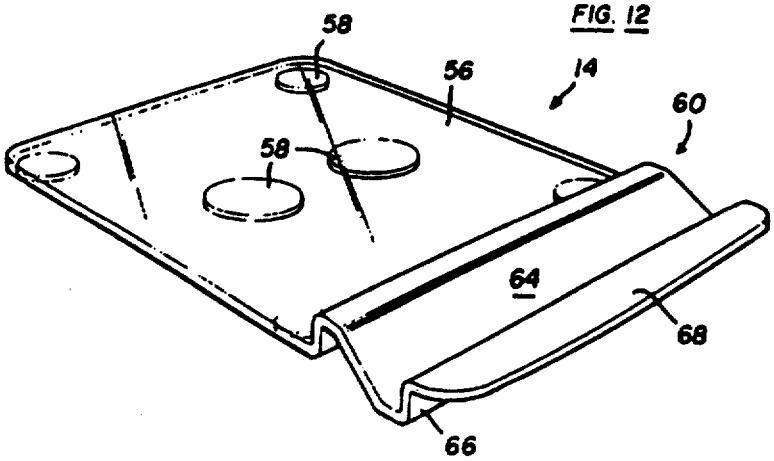
FIG. 12 is a perspective illustration of the computer terminal support of FIGS. 9, 10 and 11.

Referring next to FIGS. 9–12, still another embodiment of the present invention is illustrated. In the embodiment of FIGS. 9–12, the computer terminal support 14 includes a flat first section 56 which is to be interposed between the computer terminal and the top of the desk 12. Optionally, a plurality of pads 58 of non-marring, non-skid material such as felt may be provided on the underside of the flat section 56. Non-skid material of the type described is commercially available with an adhesive material on one side so that such material may be adhesively secured to the computer terminal support.

The first section of the computer terminal support of FIGS. 9–12 is thereafter curved to define a second section which is of generally Z-shaped configuration and, in the preferred embodiment, is integrally formed with the first section 56. Thus the second section 60 of the computer terminal support includes a first vertical portion 62 which extends upwardly from the plane of the flat section 56 and then curves back into an inclined portion 64. The inclined portion 64 is angled downwardly and forwardly relative to the first flat section 56 and is thereafter curved back upwardly to form a second vertical portion 66. The first vertical portion 62, the inclined portion 64 and the second vertical portion 66 comprise the Z-shaped second section 60 of the computer terminal support and the first and second vertical portions are parallel to each other. The second vertical portion extends upwardly to the plane of the flat first section 56 and is then curved to extend forwardly as a horizontal extension 68 parallel to and in the same plane as the flat first section 56.

In the embodiment of FIGS. 9–12, the flat first section 56 of the computer terminal support is interposed between the computer terminal 10 and the top of the desk 12. The front edge of the computer terminal may be abutted against the first vertical portion 62 of the computer terminal support. The entire computer terminal support may be moved so that the forward corner 13 of the desk 12 abuts and aligns against the underside of the inclined portion 64. Thus the inclined portion 64 provides a positive stop for aligning the support relative to the desk 12. The hands of the computer terminal operator may be rested either on the horizontal extension 68 or alternatively at the intersection of the inclined portion and the first vertical portion. Furthermore, the area between the inclined portion 64 and the second vertical portion 66 provides a trough for storage of pens, pencils, erasers and the like. The upper surface of portion 64 and extension 68 may carry conductive means such as the grounding wires or means 26 as previously described.

The foregoing is a complete explanation of the various embodiments of the present invention. In the embodiments of FIGS. 1–4, the flat section as well as the second section including the tube 24 may be integrally formed of plastic, acrylic, plexiglass, polypropylene or similar material or may optionally be formed as separate members secured together. In the embodiments of FIGS. 5–12 it is preferred that the computer terminal support be formed as a unitary integral structure of plastic, acrylic, plexiglass, polypropylene or similar material. However, it must be appreciated that the various sections may be separately made. In any event, it is preferred that where the flat first section and the second section meet, there be a suitable curving rather than a sharp edge and similarly the Z-shaped portion of the embodiment of FIGS. 9–12 should be suitably curved or rounded rather than sharp edges to ensure operator safety.

Furthermore, in all embodiments, conductive means of either wire or conductive mat-like material may be used. In all embodiments where the support rests on the desk top, non-marring, non-skid pads may be used.

It should thus be appreciated that many changes may be made without departing from the spirit and scope of the present invention. The present invention, therefore, should be limited only by the following claims.

What is claimed is:

1. A computer terminal, [keyboard or the like,] and a computer terminal support adapted to be placed on a desk top [or the like,] the desk top being of the type having a generally flat upper surface terminating in a forward edge, the computer terminal support comprising:

a first generally flat section to be interposed between the desk top and the computer terminal, said first generally flat section adapted to extend generally parallel to the desk top essentially the same width as the computer terminal; and a second section [attached] *immovably fixed relative* to said first section, said second section adapted to be interposed between the computer terminal and a computer terminal operator in close proximity to the computer terminal;

said second section extending side-to-side an amount generally the same as the width of the computer terminal;

said second section being at least partly positioned in a plane different from the plane of said first generally flat section.

2. The invention as defined in claim 1 wherein said second section includes an elongated tubular member.

3. The invention as defined in claim 1 wherein said first section and said second section are integrally formed.

4. The invention as defined in claim 1 wherein said first section and said second section are attached to the computer terminal.

5. The invention as defined in claim 1 wherein said first section includes a pair of parallel spaced apart members each of which is secured to said second section.

6. The invention as defined in claim 1 wherein said first generally flat section extends outwardly of said desk top forward edge.

7. The invention as defined in claim 1 wherein said computer terminal has a plurality of feet depending downwardly from the bottom thereof and said computer terminal support includes apertures therethrough so that the computer terminal feet extend through said apertures thereby maintaining the computer terminal level relative to the generally flat upper surface of the desk top.

8. The invention as defined in claim 1 wherein said second section includes a U-shaped member, said U-shaped member including first and second portions interconnected by an intermediate portion.

9. The invention as defined in claim 1 wherein said first generally flat section is secured to said computer terminal.

10. The invention as defined in claim 1 wherein said second section includes a stop member against which the front of said computer terminal may be aligned.

11. The invention as defined in claim 1 wherein said second section includes a trough for the storage of pens, pencils, erasers and the like.

12. The invention as defined in claim 1 wherein said second section includes a generally Z-shaped member including first and second generally parallel portions interconnected by an inclined portion.

13. The invention as defined in claim 1 wherein said second section includes a bulbous portion for supporting the hands of a computer terminal operator.

*14. The invention as defined in claim 1 wherein said second section extends vertically upwardly from said first section.*

* * * * *

UNITED STATES PATENT AND TRADEMARK OFFICE

CERTIFICATE OF CORRECTION

PATENT NO. : RE 33,556

DATED : March 19, 1991

INVENTOR(S) : Joseph J. Berke

It is certified that error appears in the above-indentified patent and that said Letters Patent is hereby corrected as shown below:

On the title page, Item [56] Other Publications insert --The Writing Machine, Michael H. Adler, pp.176 and 254--.

Signed and Sealed this

Fourth Day of January, 1994

Bruce Lehman

*Attest:*

BRUCE LEHMAN

*Attesting Officer*

*Commissioner of Patents and Trademarks*